(12) United States Patent
Duden et al.

(10) Patent No.: US 7,103,992 B2
(45) Date of Patent: Sep. 12, 2006

(54) INDUSTRIAL DISHWASHER

(75) Inventors: Roman Duden, Friedrichshafen (DE); Ralf Singer, Alshausen (DE)

(73) Assignee: Winterhalter Gastronm GmbH, Mechen Beuren (DE)

( * ) Notice: Subject to any disclaimer, the term of this patent is extended or adjusted under 35 U.S.C. 154(b) by 63 days.

(21) Appl. No.: 10/467,551

(22) PCT Filed: Jan. 31, 2002

(86) PCT No.: PCT/DE02/00348

§ 371 (c)(1), (2), (4) Date: Apr. 26, 2004

(87) PCT Pub. No.: WO02/060310

PCT Pub. Date: Aug. 8, 2002

(65) Prior Publication Data

US 2004/0187339 A1  Sep. 30, 2004

(30) Foreign Application Priority Data

Jan. 31, 2001 (DE) ............... 101 04 509
Feb. 14, 2001 (DE) ............... 101 07 108
May 11, 2001 (DE) ............... 101 22 927

(51) Int. Cl.
*F26B 21/06* (2006.01)

(52) U.S. Cl. .................. 34/381; 34/77; 134/102.3

(58) Field of Classification Search .......... 34/596, 34/77, 225, 233, 381; 134/108, 102.3
See application file for complete search history.

(56) References Cited

U.S. PATENT DOCUMENTS 3,068,877 A * 12/1962 Jacobs ................. 134/99.1
3,598,131 A    8/1971 Weihe
3,789,860 A    2/1974 Katterheinrich et al.
5,355,900 A * 10/1994 Sakata ................. 134/95.2
5,875,802 A *  3/1999 Favaro et al. ........ 134/102.3

FOREIGN PATENT DOCUMENTS

| DE | 738312    | 7/1943 |
| DE | 51687     | 9/1966 |
| DE | 2712020 A1 | 9/1978 |
| DE | 7800591   | 10/1978 |
| DE | 3028179 A2 | 2/1982 |
| DE | 4037367 A1 | 5/1992 |
| EP | 0940114 A2 | 9/1999 |
| EP | 1055389 A2 | 11/2000 |
| GB | 2030446 A | 4/1980 |

OTHER PUBLICATIONS

PCT/European Search Report.
German Search Report relating to corresponding German Patent No. 101 22 927.5.

* cited by examiner

*Primary Examiner*—S. Gravini
(74) *Attorney, Agent, or Firm*—Frommer Lawrence & Haug, LLP; Matthew K. Ryan, Esq.

(57) ABSTRACT

An industrial dishwashing machine with at least one essentially closed water circuit in which washing water is circulated, and with at least one water inflow which makes rinsing water available which is received into the water circuit after a rinsing operation following a washing operation. An air circuit is provided for drying the batchwith the air circuit being dehumidified by means of the water of the water inflow.

15 Claims, 2 Drawing Sheets

INDUSTRIAL DISHWASHER

BACKGROUND OF THE INVENTION

Figure 1:
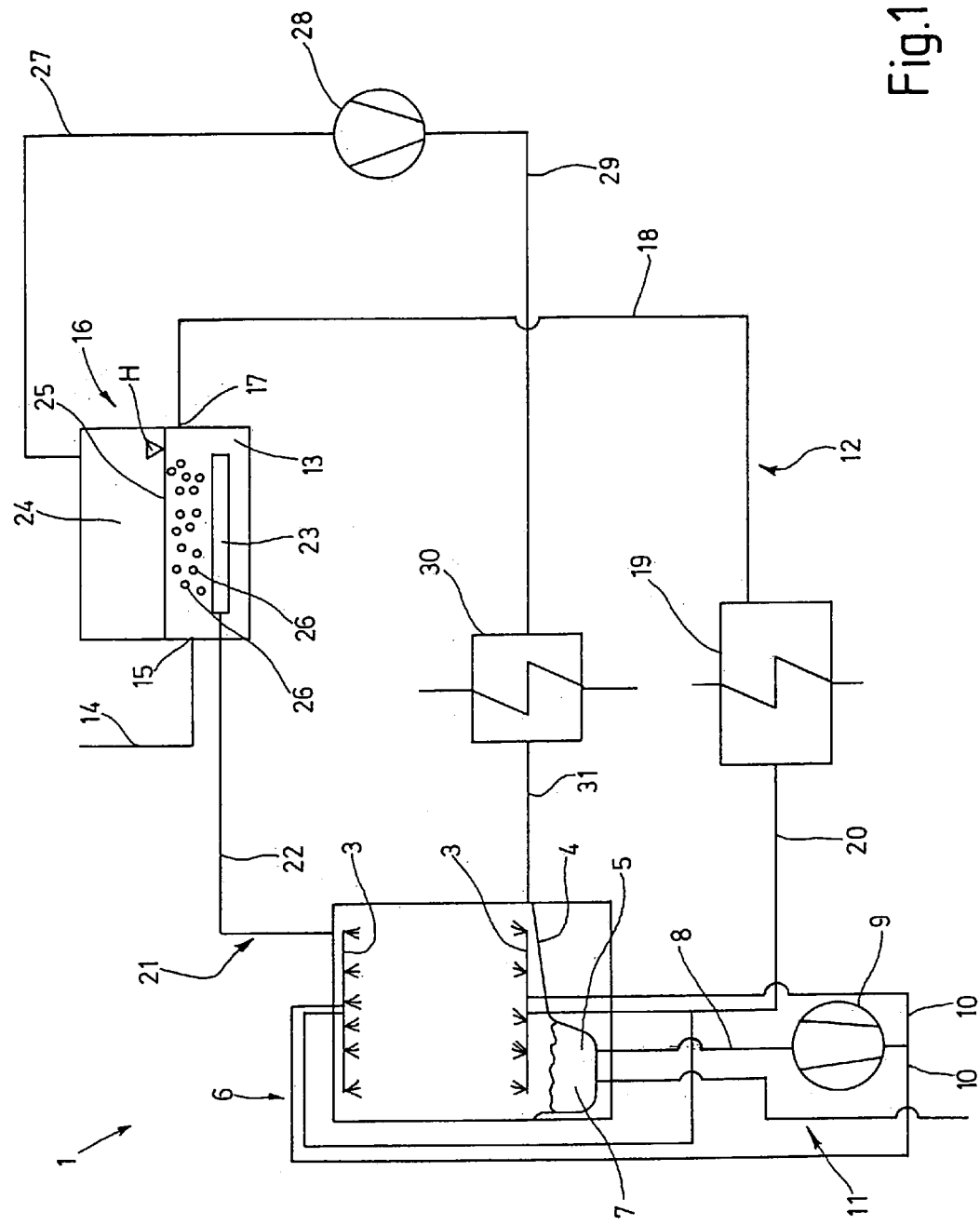

The invention relates to an industrial dishwashing machine with at least one essentially closed water circuit in which washing water is circulated.

Industrial dishwashing machines of this type usually perform about 30 to 200 work cycles a day, a work cycle lasting about 1 to 2 minutes. In contrast to this, a domestic dishwashing machine is in use only about one to 3 times a day, the washing duration being about one hour here. In known industrial dishwashing machines, a work cycle comprises, as a rule, a washing stage, a rinsing stage, and what is known as a drying operation. On opening of the industrial dishwashing machine after the drying operation, in order to remove the batch, results in the steam formed in the washing compartment during the drying operation escaping into the surroundings. One disadvantage of this is that a hot humid climate occurs in the workspace in which the dishwashing machine is standing and becomes more extreme with each work cycle of the dishwashing machine. Furthermore, whenever the dishwashing machine is opened after the drying operation, a large quantity of energy is released, which is not available for further work cycles.

GB 2 030 446 A discloses a continuously operating dishwashing machine, in which a batch is delivered on one side and is transported through the entire dishwashing machine via a conveyer belt, so that it is discharged on the other side after the rinsing operation. This publication discloses, furthermore, a suction extraction device for the suction extraction of hot humid air, this air being cooled and dehumidified in a heat exchanger device, whereupon it is discharged as spent air into the surroundings.

An object of the present invention is to make available an industrial dishwashing machine, in which the formation of a hot humid climate in the surroundings is avoided as efficiently as possible, but at the same time an effective drying operation becomes possible. An object of the present invention is, furthermore, to make available a corresponding method.

Figure 2:
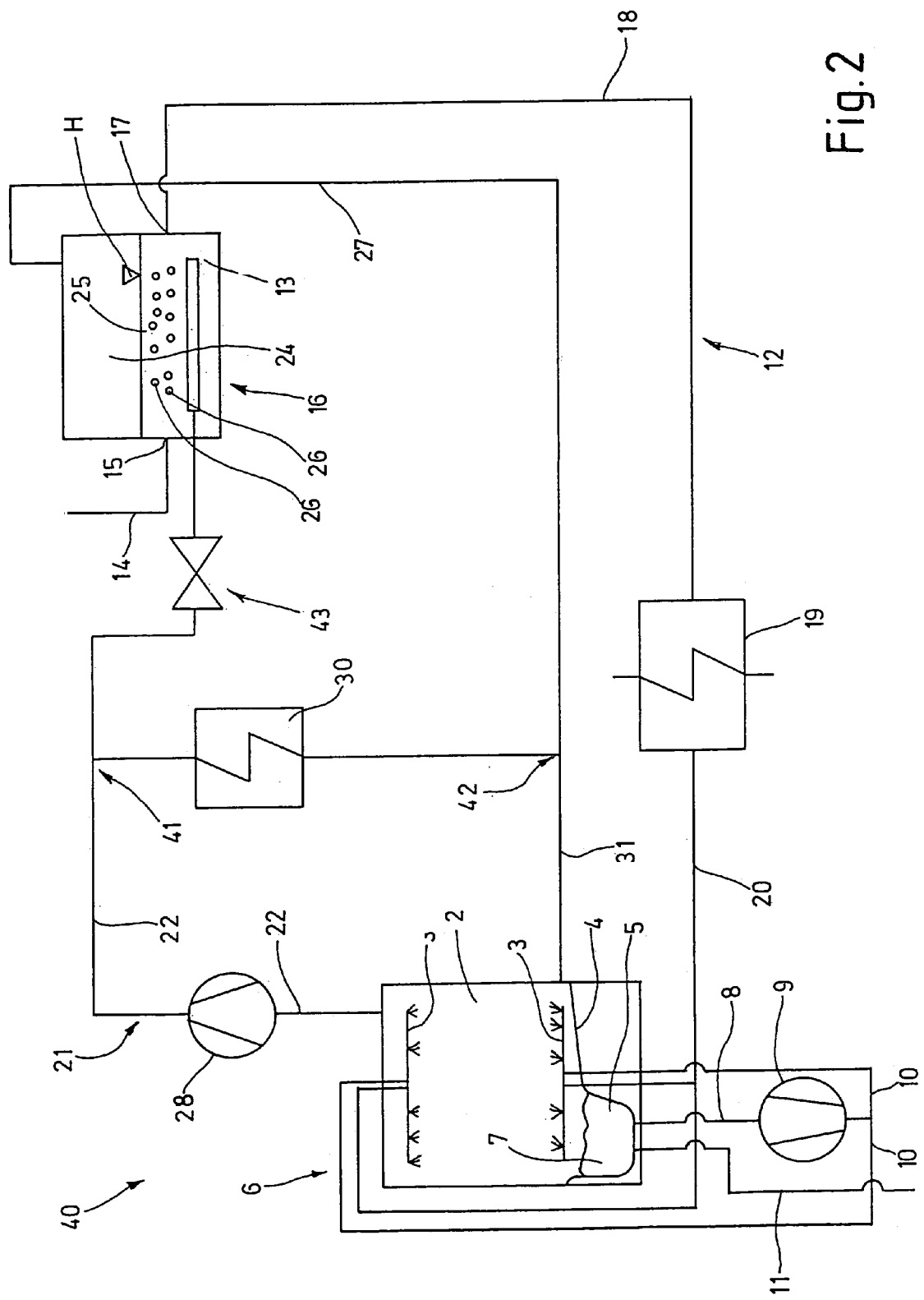

Further details of the invention are described, with reference to exemplary embodiments illustrated diagrammatically, in the drawing, in which:

FIG. 1 shows a diagrammatic illustration of an industrial dishwashing machine with an air circuit, and FIG. 2 shows a diagrammatic illustration of a further industrial dishwashing machine with an air circuit.

DESCRIPTION OF THE PREFERRED EMBODIMENT

FIG. 1 illustrates a diagrammatic view of an industrial dishwashing machine 1. The dishwashing machine 1 comprises essentially a washing compartment 2, in which the batch, not illustrated, is arranged, a water circuit 6, a water inflow 12, a water outflow 11 and an air circuit 21. A complete work cycle of the dishwashing machine 1 consists essentially of three successive cycles. These are the washing cycle, rinsing cycle and drying cycle. The washing cycle involves mainly the water circuit 6, the rinsing cycle is carried out essentially by means of the water inflow 12, and, in the drying cycle, the water inflow 12 and the air circuit 21 cooperate. The batch is arranged in the washing compartment 2 between washing arms 3. Below the batch and the washing arms 3 is arranged a tub 4 which conducts the water present in the washing compartment 2 into a tank 5. The tank 5 belongs to the water circuit 6, in which the washing water 7 required for a washing operation is circulated. During the washing operation, water is extracted from the tank 5 via a line 8 and is led to a pump 9. The washing water 7 is led from the pump 9 via lines 10 to the washing arms 3 and is sprayed into the washing compartment 2 by these. In the washing compartment 2, the washing water 7 then runs into the tank 5 again via the tub 4. The water circuit 6 also contains further components, not illustrated, such as, for example, a device for adding washing agent, heating for heating the washing water, a cleaning device for the washing water and sensors. Furthermore, a water outflow 11, via which washing water 7 can be discharged, is connected to the tank 5. For example, after each washing cycle, some of the washing water 7 is discharged via the water outflow 11. The tank 5 is filled up with the aid of the water inflow 12 which makes available rinsing water 13 which is supplied to the tank 5 via the tub 4 after the rinsing operation. The water inflow 12 is connected to a water source, not illustrated, via a line 14. The line 14 leads via an inflow 15 into a dehumidifier 16 which is filled with water 13 to a height H. The dehumidifier 16 is connected via an outflow 17, by means of a line 18, to a heating element 19 which heats the water 13 to a temperature of about 65° C. to 85° C. During the rinsing cycle, the heated rinsing water 13 is led from the heating element through a line 20 to the washing arms 3, via which it is distributed to the batch. The washing water is distributed in the washing compartment via the washing arms 3 by means of washing nozzles.

According to a design variant which is not illustrated, the distribution of the rinsing water takes place via rinsing arms and/or rinsing nozzles, the washing arms and rinsing arms or the washing nozzles and rinsing nozzles being different components. According to the design variant which is not illustrated, therefore, the washing cycle and the rinsing cycle take place via two separate systems.

As already described above, the rinsing water 13 is supplied to the tank 5 via the tub 4 and thus becomes washing water 7. Furthermore, the dishwashing machine 1 comprises the air circuit 21 which is active during a drying cycle. The washing compartment 2 is connected to the dehumidifier 16 via a line 22, the line 22 being led to a distributor 23 which is arranged in the interior 24 of the dehumidifier 16 below a water level 25. Air 26, which is led in the line 22 from the washing compartment 2 to the dehumidifier 16, emerges from the distributor 23 and is led out of the dehumidifier 16 via an air line 27 to a fan 28 which ensures a flow of the air 26 clockwise through the air circuit 21. The fan 28 is connected via an air line 29 to heating, in which the air 26 is heated before it passes through the air line 31 into the washing compartment 2, flows through the latter and leaves again via the air line 22. The drying cycle is described in detail again below. After the rinsing cycle, the moist supersaturated air (approximately 60° C., approximately 100% relative air humidity or an absolute air humidity of approximately 160 g/kg) is sucked out of the washing compartment 2 via the air line 22 and is dehumidified or cooled in the dehumidifier 16. Dehumidification or cooling takes place as a result of direct contact of the air 26 with the cold rinsing water 13 in which the air 26 rises. The dehumidified and cooled air (approximately 30° C., approximately 100% relative air humidity or approximately 30 g/kg absolute air humidity) is extracted from the dehumidifier 16 via the air line 27 and is blown by the fan 28, via the air line 29, into the heating 30. Here, the air is heated to approximately 140° C. (approximately 1.2% relative air humidity or approximately 130 g/kg absolute air humidity) and is blown into the washing compartment 2 via the air line 31. In the washing compartment 2, this air is mixed with the supersaturated air present in the washing compartment and is thus saturated. Via the air circuit 21, the air 26 can be circulated once or more than once as required, and thus dehumidified. The fresh water 13 which is required for each rinsing cycle is preheated via the dehumidifier 16 which is designed as a heat exchanger and in which the air is cooled. The fresh water 13 serves as a cooling medium for the air 26. This preheating of the fresh water 13 taking place in the dehumidifier 16 is carried out before the fresh water is heated to about 65° C. (for glass washing machines) or 85° C. (for utensil washing machines) in the heating 19 designed as a boiler. The fan 28 may be arranged in the air circuit 21 between washing compartment 2 and dehumidifier 16 or dehumidifier 16 and heating 30 or heating 30 and washing compartment 2. About 2 minutes are provided for the drying cycle. According to a design variant, the fan 28 continues to run, with the heating 30 switched off, even after the conclusion of the drying cycle. An effect of drying or cooling the batch located in the washing compartment 2 is thereby achieved. In order to retain the energy acquired from the moist drying air 26 optimally for the following work cycle of the dishwashing machine 1, there is provision for insulating the dehumidifier 16, the lines 27, 29 and the fan 28.

FIG. 2 illustrates a variant of the industrial dishwashing machine 1 illustrated in FIG. 1. The dishwashing machine 40 illustrated in FIG. 2 differs from the dishwashing machine 1 illustrated in FIG. 1 in a parallel connection of the heating 30 and of the dehumidifier 16 in the air circuit 21. The air stream which leaves the washing compartment 2 via the air line 22 is divided at a branch point 41. Part of the air stream is led through the dehumidifier 16 and is dehumidified and cooled here to approximately 30° C. and approximately 100% relative air humidity or approximately 30 g/kg absolute air humidity. The other part is led via the heating 30 and is heated there to approximately 140° C. (approximately 5.4% relative air humidity or approximately 160 g/kg absolute air humidity). The two air streams are combined again at a second branch point 42. This results, on the precondition that the air streams have been divided in the ratio of 1:1, in an air temperature of about 91° C. with 17% relative air humidity or 96.5 g/kg absolute air humidity. This mixed air is blown into the washing compartment 2 again via the air line 31. It is possible, via a valve 43 arranged upstream of the dehumidifier 16, to set the mixture ratio of the two air streams running parallel.

The invention is not restricted to exemplary embodiments illustrated and described. On the contrary, it embraces developments of the invention within the scope of the patent claims. In particular, the invention also provides for designing the air circuit as an open circuit, in which the air extracted from the washing compartment is conducted, after dehumidification or cooling, into the surroundings and heated surrounding air is returned into the washing compartment. There is provision, furthermore, for designing the dehumidifier or heat exchanger in such a way that the media, air and water, have no direct contact in the latter.

What is claimed is:

1. An industrial dishwashing machine comprising a washing compartment with at least one essentially closed water circuit in which washing water is circulated, and with at least one water inflow which makes available rinsing water which is received into the water circuit after a rinsing operation following a washing operation, wherein an air stream generating device for drying a batch arranged in the washing compartment is provided and wherein said air stream circulates in a closed air circuit and is dehumidified in a dehumidifier which contains rinsing water, and wherein the rinsing water is preheated in the dehumidifier, wherein during the operation of the air circuit, the water of the water inflow fills the dehumidifier up to a water level (H) and, in particular, flows through it.

2. The dishwashing machine as claimed in claim 1, wherein the dehumidifier is a direct heat exchanger in which the media are mixed and unmixed.

3. The dishwashing machine as claimed in claim 1, wherein the dehumidifier is a cooling register having a closed-off container with an inflow and an outflow.

4. The dishwashing machine as claimed in claim 1, wherein the dehumidifier is an indirect heat exchanger through which the media flow in closed line systems.

5. The dishwashing machine as claimed in claim 1, wherein an air circuit is active when the water and/or the water inflow is/are at rest.

6. The dishwashing machine as claimed in claim 5, wherein the air circuit comprises at least one fan and/or, one heating element and/or, at least one valve.

7. The dishwashing machine as claimed in claim 1, wherein the dehumidifier and the heating element are arranged in series in the air circuit.

8. The dishwashing machine as claimed in claim 1, wherein the dehumidifier and the heating element are arranged parallel to one another in the air circuit.

9. The dishwashing machine as claimed in claim 1 wherein the air circuit is a closed and/or open circuit and flows through a washing compartment of the dishwashing machine.

10. The dishwashing machine as claimed in claim 1 wherein the water inflow comprises at least one heating element, which is arranged between the dehumidifier and the washing compartment.

11. The dishwashing machine as claimed in claim 1 wherein the water inflow connects to washing arms of the dishwashing machine from a freshwater supply.

12. The dishwashing machine as claimed in claim 1 wherein the air of the air circuit enters an interior of the dehumidifier via a distributor arranged in the dehumidifier and emerges from the dehumidifier via an orifice arranged above a water level.

13. The dishwashing machine as claimed in claim 1 wherein the water of the water inflow enters the interior of the dehumidifier via an inflow and emerges from the interior of the dehumidifier via an outflow.

14. The dishwashing machine as claimed in claim 1 wherein the distributor is arranged below the water level.

15. A method for the washing and drying of a batch which is arranged in a washing compartment comprising at least a washing operation, a rinsing operation and a drying operation which are carried out in succession in the washing compartment and wherein, during the drying operation, an air stream for drying the batch is generated within the washing compartment with the air circulating in a closed air circuit and being dehumidified in a dehumidifier by means of a supply of rinsing water for the rinsing operation which is contained in said dehumidifier, and the rinsing water being preheated in said dehumidifier, wherein during the operation of the air circuit, the water of a water inflow fills the dehumidifier up to a water level (H) and, in particular, flows through it.

* * * * *

UNITED STATES PATENT AND TRADEMARK OFFICE
CERTIFICATE OF CORRECTION

PATENT NO. : 7,103,992 B2
APPLICATION NO. : 10/467551
DATED : September 12, 2006
INVENTOR(S) : Roman Duden and Ralf Singer It is certified that error appears in the above-identified patent and that said Letters Patent is hereby corrected as shown below:

ON THE TITLE PAGE

Under (73) Assignee:

change "Winterhalter Gastronm GmbH" to --WINTERHALTER GASTRONOM GmbH--

Signed and Sealed this

Fifth Day of December, 2006

JON W. DUDAS
*Director of the United States Patent and Trademark Office*